Oct. 30, 1951     W. B. NEWKIRK ET AL     2,573,048
STARCH MANUFACTURING PROCESS
Filed May 26, 1950     3 Sheets-Sheet 1
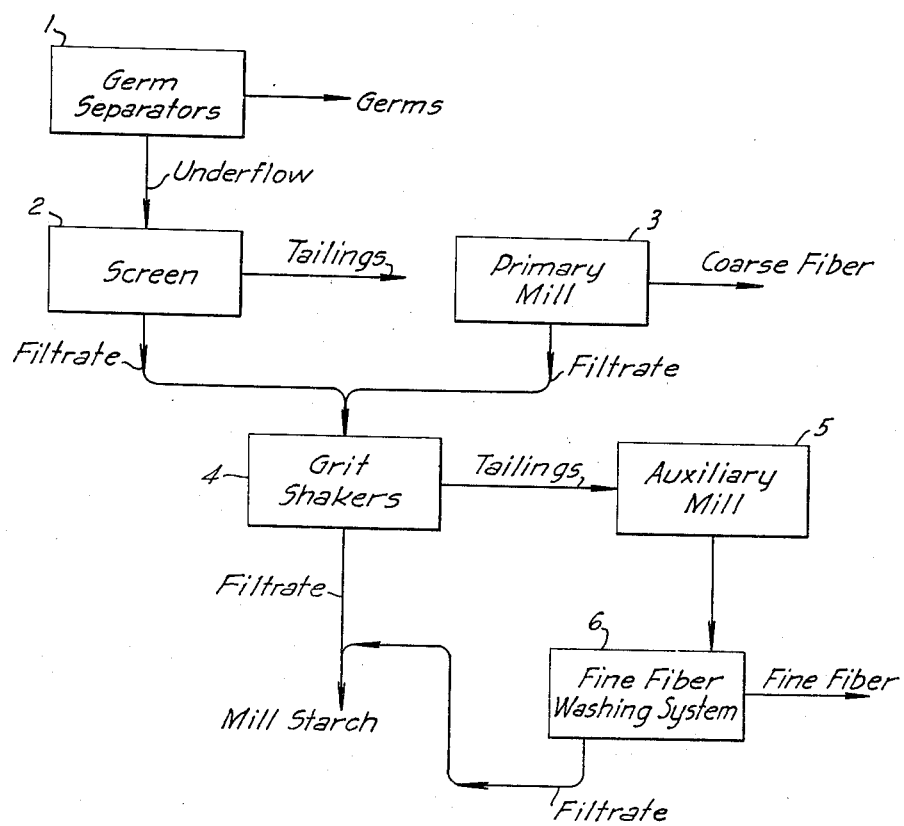
FIG_1_
INVENTORS
WILLIAM B. NEWKIRK
EDGAR H. WILLIAMS
CARL A. RIETZ
ARCHIBALD B. DUNWODY
BY Mildred Oncken
AGENT

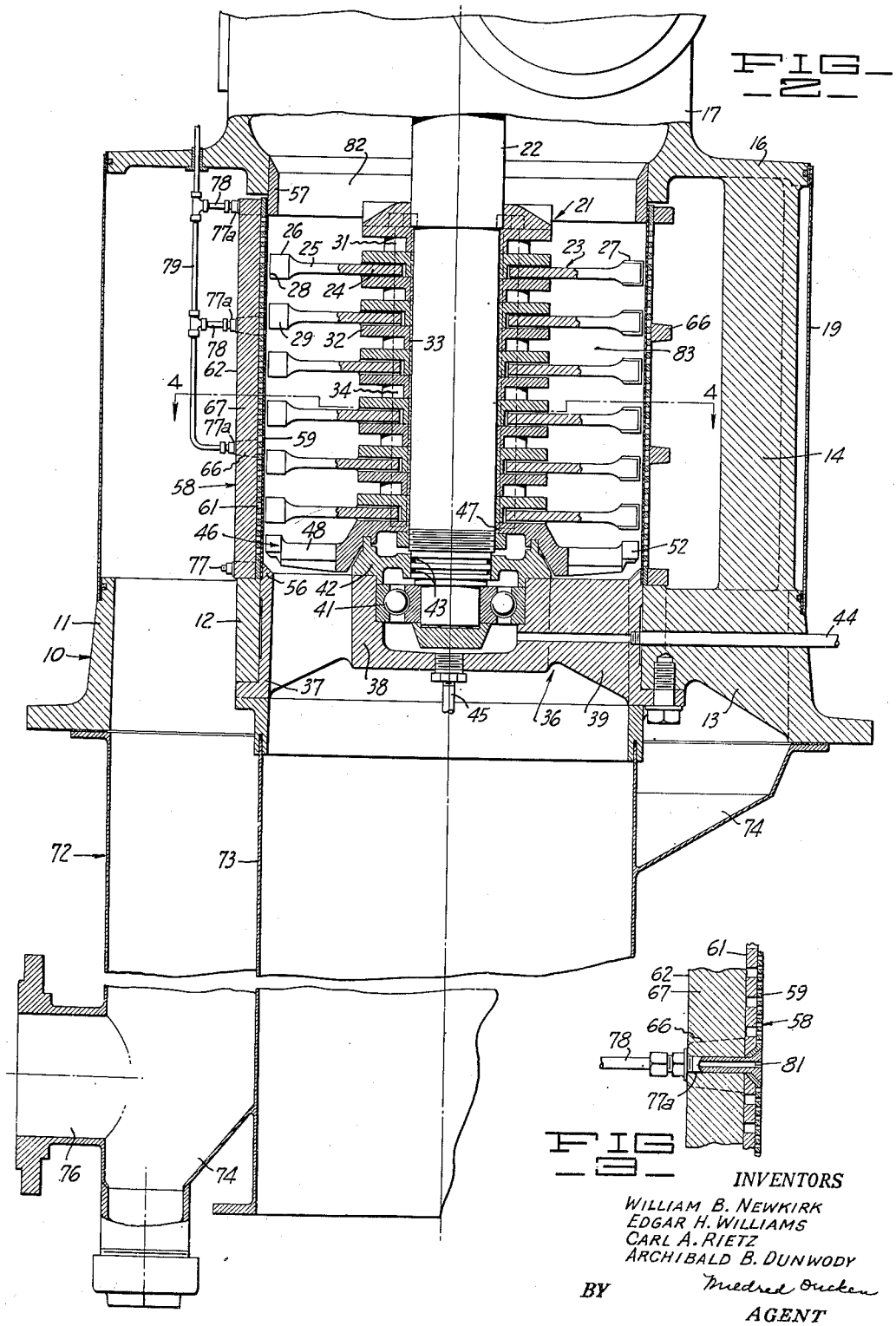

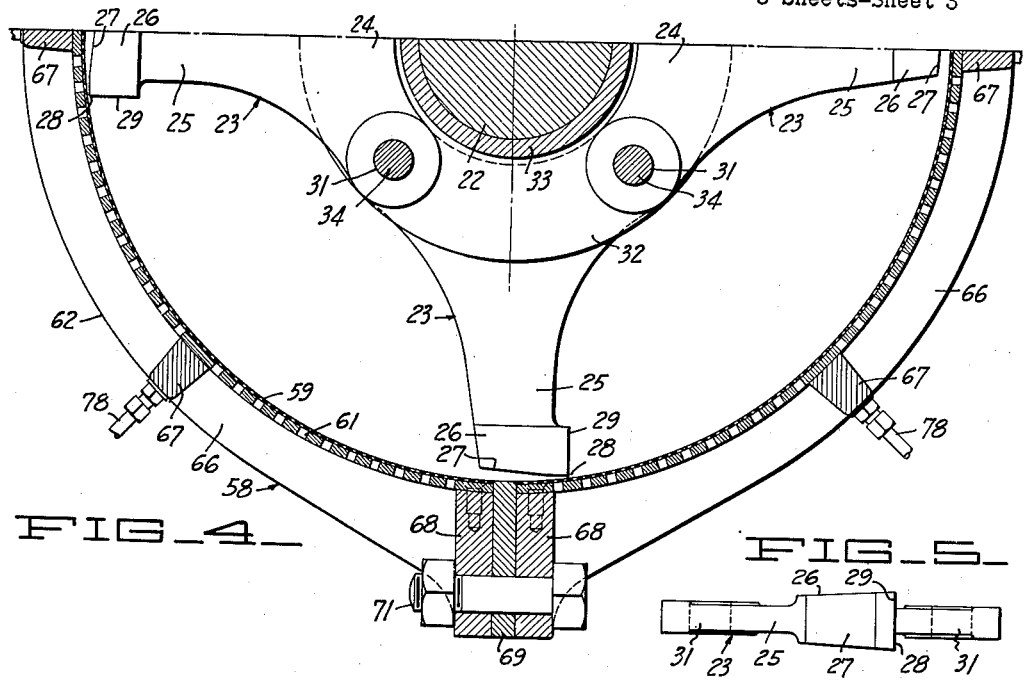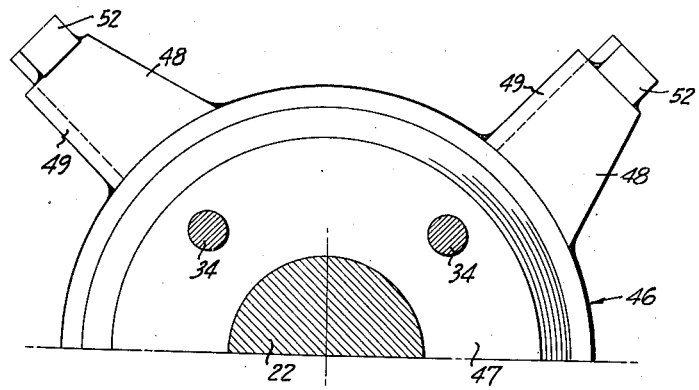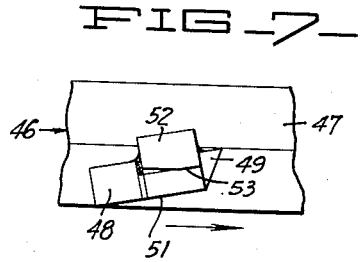

Patented Oct. 30, 1951

2,573,048

UNITED STATES PATENT OFFICE 2,573,048

STARCH MANUFACTURING PROCESS

William B. Newkirk, La Grange, and Edgar H. Williams, Glen Ellyn, Ill., Carl A. Rietz, San Francisco, Calif., and Archibald B. Dunwody, Evanston, Ill., assignors of one-half to Corn Products Refining Company, New York, N. Y., a corporation of New Jersey, and one-half to Rietz Manufacturing Company, San Francisco, Calif., a corporation of California Application May 26, 1950, Serial No. 164,428

17 Claims. (Cl. 127—68)

This invention relates to the manufacture of starch and by-products from starch-bearing materials such as cereal grains, e. g. corn and sorghum grains, by the wet method; and in particular it relates to methods for freeing and separating the starch from the fiber of the starch-bearing material.

In the manufacture of starch from starch-bearing materials such as corn and sorghum grains it has been customary to steep the corn and withdraw the steepwater to evaporators for recovery of the solubles contained therein. The steeped grain is then comminuted and subjected to separating operations in water for removal of the germs, hulls and fiber. The usual method is to break up the grain coarsely (cracking) to free the germs, separate the germs by flotation, and wash the germs to remove starch and gluten; then further grind the residue of the grain and subject the ground material to coarse fiber separating, washing, dewatering or squeezing, and drying operations in which starch and gluten are washed from the fibrous part of the grain by passing the material through a series of copper mesh covered reels or shaking screens. The mixture of starch, gluten and water from the latter operation is passed through silk covered reels or shakers to remove residual fiber particles (fine fiber) therein, which latter are then subjected to washing operations on a series of silk-covered reels or shakers, for the purpose of washing from the fine fiber the starch and gluten which adheres to it. The mill starch streams (starch, gluten, and water) from the germ, coarse fiber, and fine fiber separating and washing operations are then run through shallow, slightly inclined troughs (starch tables) or otherwise treated, for example by centrifuges, for separation of the gluten and the bulk of the water from the starch, which may then be subjected to one or more washing operations to further purify it.

Heretofore Buhr mills have been used to further grind the residue of the grain remaining after removal of the germ by flotation. These mills depend for their grinding action upon large stone wheels which have been used for centuries in various types of milling. The grinding teeth of these stone wheels wear down or dull rapidly and require frequent recutting or dressing operations to renew the grinding surfaces for satisfactory milling. These dressing operations are expensive both as to the amount of labor involved and as to the fact that each mill is out-of-service about eight hours every five days. Further, they present a health hazard due to the possibility of silicosis. Another disadvantage of the Buhr mills lies in the fact that stones for replacement are difficult to obtain as they must be procured from Europe and furthermore even this source of supply is dwindling since stone mills have long ago been replaced by other types of mills for most purposes.

The primary object of the present invention is to provide certain improvements in the wet method of starch manufacture. More specifically, it is an object of this invention to provide an improved process for removing starch from cracked, degerminated grains. Another object is to provide a simplified and more economical method for recovering starch from starch-bearing materials. It is also an object of this invention to eliminate the customary system of separating and washing reels or shakers and squeezers known collectively as the coarse fiber system. It is a further object to provide a process for effecting an improved separation between the starch and non-starch components of the starch-bearing material. Still another object is to provide a process for recycling of certain process waters so that the present improvements in the wet method of manufacturing starch may be readily adapted to use in a closed or "bottled-up" wet milling system.

According to the improved process of the present invention the degerminated starch-bearing material is ground, the coarse fiber separated therefrom and simultaneously dewatered.

In general the present invention makes use of an impact type of disintegrator for the purpose of acting upon starch grits withdrawn from the germ separating operation of the wet starch manufacturing process. Simultaneously with such impact disintegration, a substantial amount of coarse fiber is withdrawn from the material being treated, thereby greatly lessening the load on the separating systems. In conjunction with impact disintegration the particles in the disintegrating zone are continuously hydrated to promote effective separation of starch and fiber. Two discharges are obtained from the operation: 1. a liquid or filtrate containing stach, gluten, grits, fine fiber and water; and 2. a solid phase consisting chiefly of coarse fiber.

The coarse fiber discharged requires no further separating and washing operations, thus eliminating any necessity for the entire coarse fiber system of prior wet milling processes, and is in satisfactory condition for drying in conventional driers. By the improved process of the present invention the average total starch content of the coarse fiber was about 10%, whereas in a conventional wet milling plant the average total starch content of coarse fiber over a period of one year was about 12.2%. Thus, an increased recovery of starch amounting to approximately 100 lbs. of starch per 1000 bushels of corn ground may be achieved by our improved process.

The filtrate or aqueous slurry phase of the discharge passes over a suitable screen or shaker to remove fine fiber and grits and obtain a mill starch (starch and gluten) slurry, which is then further processed by known methods, for example by tabling or centrifuging.

The fine fiber and grits which discharge as tailings from the screen or shaker are then advantageously sent to a pulper, such as a suitable attrition mill, where they are further ground to recover additional starch. This pulper discharges to the fine fiber washing and separating system such as is part of conventional wet milling plants, where the additional starch freed by the pulper is separated and subsequently enters the mill starch stream.

The invention may be more clearly understood from the following detailed description in conjunction with the annexed drawings.

Figure 1 is a flow chart illustrating a presently preferred embodiment of the improved process.

Figure 2 is a side elevational view in section illustrating a disintegrating machine which can be used in carrying out the process.

Figure 3 is an enlarged cross-sectional detail illustrating means employed for introducing water into the zone of operation of the rotor.

Figure 4 is a half cross-sectional view on an enlarged scale taken along the line 4—4 of Figure 2.

Figure 5 is an end view of one of the disintegrating hammers of the rotor and on the same scale as Figure 4.

Figure 6 is a plan view illustrating the lowermost defecating hammers 46 and on the same scale as Figure 4.

Figure 7 is an end view of one of the hammer arms illustrated in Figure 6.

Referring to Figure 1 of the drawings, 1 represents the usual separators where the germs, previously loosed by the coarse grinding or cracking of the grain, are floated off the top of a starch liquor of suitable gravity, while the remainder of the unground starch-bearing material sinks. The underflow, i. e. the material drawn off from the bottom, then advantageously is passed over a screen 2 to remove the unground material from the starch, gluten, grits, etc. already freed. These separators 1 and screen 2 are part of the conventional wet milling system. However, this screen is optional in the present improved process, and, if desired, underflow from the germ separators may be used directly, thus further simplifying customary wet milling practice. The filtrate from screen 2 passes to the usual grit shakers 4. Tailings from the screen (or underflow directly if screen is omitted) are sent to an impact mill or disintegrator 3, which will be described in detail below, which discharges two phases; one a solid phase consisting of the coarse fiber, which may then be dried and used for animal feeding purposes in the usual manner, and the second a liquid phase consisting of starch, gluten, grits, fine fiber, and water. The latter, i. e. the filtrate, passes over screens 4 such as the customary grit shakers, where starch and gluten (mill starch) are separated from fine fiber and grits and subsequently treated in the customary way. According to the embodiment of the process illustrated in Figure 1, the filtrates from screen 2 and the primary mill 3 are passed over the same set of grit shakers 4. However, a variation of this process may be used in which the filtrates from screen 2 and primary mill 3 are passed over separate grit shakers, i. e. maintained as separate streams, if it is desired to take advantage of the possible difference in specific gravities of the two grit shakers filtrates in other parts of the conventional bottled-up wet milling system. The tailings from the screens or grit shakers 4 then proceed to an auxiliary mill or pulper 5 where they are further ground to enable recovery of additional starch. Various types of mills are suitable for use in the process at this point. One presently preferred type will be described in detail below. The discharge from mill 5 then enters the fine fiber washing and separating system of conventional wet milling practice, the additional starch and gluten contained in the filtrates of this system eventually being added to the regular mill starch stream.

The machine illustrated in Figures 2 to 7 inclusive, is the preferred form of apparatus for the primary mill 3 for carrying out the disintegrating operation. This machine consists of a supporting base 10, which serves to carry the working parts of the machine. The base is formed to provide the outer and inner annular parts 11 and 12, which are connected by the radially extending webs 13. Vertical standards 14 are carried by the base, and are attached at their upper ends with the annular top wall 16. A feed chamber 17 extends upwardly from wall 16, and in turn serves to mount an electric driving motor (not shown). A shell or housing 19 generally surrounds the structure just described to provide a closed interior.

Located centrally of the supporting base and on a vertical axis, there is a disintegrating rotor 21, which is mounted upon the vertical drive shaft 22. This shaft can be directly driven by the electric motor. The rotor is provided with a plurality of radially extending disintegrating hammers 23.

Figures 4 and 5 serve to illustrate the construction of the hammers 23 and the manner in which the hammers are secured to the shaft. Each hammer (Figure 4) is provided with an arcuate base portion 24a, radially extending shank 25, and a head portion 26. The head is wider in a vertical direction than the thickness of the shank 25. The heel 27 of the head is cut away (i. e. relieved) as illustrated, whereby the advancing edge 28 is of greatest radial distance from the axis of rotation. The advancing face 29 of the head is substantially flat and is coincident with a vertical plane substantially parallel to the general radial axis of the hammer. The arcuate base portion 24 is provided with openings 31 which are spaced apart by an arc of substantially 90°. It will be noted that the base portions 24 of the hammers are disposed between flanges 32 of the hubs 33. Each of the flanges are provided with four openings, and all of these openings are vertically aligned with the openings 31 of the hammers, and serve to receive the vertically extending anchoring rods 34.

Below the rotor there is what can be termed a "spider" 36. This spider includes the outer and inner annular parts 37 and 38, which are connected by the radially extending webs 39. These webs are tapered downwardly (Figure 2) to facilitate downward movement of material. The member 36 serves as a mounting for the ball bearing assembly 41, which in turn forms a journal for the lower end of the shaft 22. The space occupied by the ball bearing assembly 41 is shown closed by the cover 42, and this cover is provided with a suitable seal 43 between the same and the shaft. A pipe 44 can connect with the space occupied by the ball bearing assembly for introducing a suitable lubricant, and another pipe 45 can serve for drainage.

At the lower end of the rotor and immediately above the webs 39, there is a set of special defecating hammers 46. These hammers are illustrated particularly in Figures 6 and 7. Thus an annular hub 47 forms the lower part of the rotor assembly, and serves to mount the rods or bolts 34. The outer periphery of this hub carries the radially extending arms 48, which have substantially flat forward impact faces 49 and substantially flat lower faces 51. The upper edges of the faces 49 are advanced so that these faces are in effect tipped forwardly with respect to the direction of rotation. Thus when these faces impact material, the material on rebound has imparted to it a downward direction component. The lower faces 51 tend to press material downwardly through the spaces between the webs 39. Each arm is also provided with a tip 52 which is offset upwardly in order to clear the upper edge of the annular part 37 (Figure 2). The lower face 53 of this tip can be parallel with the face 51.

The upper edge of part 37 forms a flange 56, which together with a flange 57 carried by the top wall 16, forms means for mounting the screen assembly 58. The screen assembly consists of an inner cylindrical screen 59, of relatively fine mesh, which is surrounded by a reinforcing or backing means 61 which is in the form of a perforated metal plate. In a typical instance the screen 59 may be formed of stainless steel sheet having round 1/16 inch diameter holes. The backing screen 61 can be formed of stainless steel plate provided with round perforations measuring about 1/8 inch diameter. The screen 59 together with a perforated backing plate 61 is carried within a rigid basket 62. The basket is preferably made of two semi-cylindrical parts (Figure 4) and consists of vertically spaced arcuate ribs 66, which are connected by the circumferentially spaced and vertically extending ribs 67. The edges of the two sections have vertically extending clamping flanges 68. The screen 59 and the backing plate 61, are in two semi-cylindrical sections, which are fitted within the two sections of the basket as illustrated in Figure 4. A spacer plate 69 is interposed between the flanges 68, and the two flanges are secured together by clamping bolts 71. When the bolts 71 are tightened with the screen assembly positioned to surround and engage the flange portions 56 and 57, the flanges just mentioned are gripped to retain the screen assembly in proper alignment with the rotor. Care should be taken to provide relatively close spacing between the ends of the hammers 23 and the inner surface of the screen 59. In practice a spacing of about 1/32 of an inch has given good results.

The lower end of the machine is provided with hopper means 72 for receiving and discharging the disintegrated material. This hopper means includes an inner conduit 73 having its upper end immediately underlying the spider 36, and which therefore receives fibrous material being delivered downwardly from the lower end of the rotor. A hopper portion 74 surrounds the conduit 73 and extends downwardly to the discharge opening 76. The hopper portion 74 immediately underlies the spacing between the webs 13 and receives all of the material passing through the screen assembly.

In addition to the parts described above, the machine is provided with means for continuously introducing a spray of water or like wash liquor into the zone of operation of the rotor. As shown in Figures 2, 3, and 4, it is desirable to attach the sections of the screen and of the backing plate 61 to the basket 62 by means of the bolts 77. Certain ones 77a of these bolts are bored to form passages for communicating with the water supply pipes 78. All of the pipes 78 can connect with a common water supply pipe by means of which a continuous stream of water can be applied under pressure. Discharge nozzles or orifices 81 communicate with the inner ends of the passages in the bolts 77a, whereby jets of water are discharged continuously into the zone of operation of the rotor hammers. As will be presently explained in greater detail, when in operation the rotor is driven at a relatively high rate of speed, such as 3600 R. P. M. As the material being disintegrated progresses downwardly in the zone of the rotating hammers, forces are imparted to the mass which tend to discharge the moisture therefrom. The jets of water remoisten and hydrate the mass, thereby facilitating the continued disintegration and separation of the starch from the fiber.

As is evident from Figure 2, material to be disintegrated is fed into the feed chamber 17, and from this chamber passes downwardly through opening 82 into the vertically extending zone of operation 83 of the rotor. In passing through the zone of operation the material is repeatedly impacted by the hammers to effect mechanical disintegration, and is repeatedly hydrated with water to condition it for optimum separation between starch particles and fiber. With the feed comprising starch grits together with fibrous material, the starch grits are disintegrated by impact to produce starch particles of sufficient fineness to pass out through the screen assembly. In conjunction with disintegration of the starch grits fiber is released from the starch particles, and some fiber is disintegrated to a particle fineness such that is passes out through the screen assembly together with the starch. A considerable part of the fiber, however, does not pass through the screen assembly, but instead progresses downwardly to be finally acted upon by the defecating hammers 46. It is then discharged through the spaces between the webs 39 for final discharge from the machine.

As aforementioned in connection with the annexed flow chart shown in Figure 1, in order to secure maximum possible starch recovery, tailings from the grit shakers 4 are further ground in an auxiliary mill 5. However, if desired, this step may be omitted and the tailings from the grit shaker disposed of as desired.

This auxiliary mill 5 may be of any suitable type designed for operation on wet material or slurries and adjustable to close tolerances, such as, for example, an impact disintegrator, colloid type mill, or a single or double runner high speed attrition mill, e. g. the type of attrition mill used in the paper industry to separate fiber bundles with a minimum of cutting. For example, a double runner high speed attrition mill with plates having radial ribs in concentric circles offset to provide suitable dams or plates having essentially radial groups of parallel ribs with dams or plates having essentially radial groups of parallel ribs with dams spaced in the valleys between the ribs, operating at 1750 R. P. M. and a plate clearance of approximately .002 to .005 inch, afforded a satisfactory auxiliary mill.

For best results the supply to the primary mill 3 should have a moisture content of about 75 percent to about 95 percent, preferably approximately 85%. The tailings from screen or grit shakers 4, entering the auxiliary mill 5, will usually have a similar moisture content.

When grinding corn according to the system outlined in the flow chart of Figure 1, the flow rate of wash water entering the disintegrator through the internal washing sprays was set at 1 to 1½ G. P. M. per spray (total 6 to 10 G. P. M). However, when operating according to the alternative procedure mentioned above, wherein screen 2 of Figure 1 is bypassed or omitted, and the germ separator underflow is fed directly to the disintegrator, the flow rate of the internal washing sprays should be reduced, e. g. to about ½ to 1 G. P. M. per spray (total 3–6 G. P. M.) since the supply has a greater fluidity.

In continuous operation of the improved wet milling system described herein on grinding corn, coarse fiber discharge having a total starch content within the range of about 7 to about 10 percent and moisture content of about 58 to about 60 percent may be obtained, although these values may be slightly higher if screen 2 is omitted. Washed fine fiber starch contents may be obtained within the range of about 16 to about 25 percent.

Additional starch may be recovered from the coarse fiber discharge according to the present process by giving the coarse fiber a second pass through a primary mill or disintegrator of the type described herein. This procedure is particularly advantageous when milling grains such as grain sorghum wherein it is inherently more difficult to remove the starch from the coarse fiber due to the fact that the characteristics of the coarse fiber obtained from grain sorghum and corn, for example, are considerably different. Both the starch and moisture contents of coarse fiber from grain sorghum are appreciably higher than those for corn when processed under comparable conditions. For example, the average starch content of grain sorghum coarse fiber when employing Buhr mills is about 20–25%, as compared to about 12% for corn. The fine fiber starch content of grain sorghum is also higher than corresponding values for corn being about 45–49%. When milling grain sorghum according to the present invention, the starch content of grain sorghum coarse fiber may range from about 15 to about 30 while fine fiber starch content as low as 16 to 25 percent or about the same as comparable figures for corn may be obtained.

By the use of a second disintegrating or primary milling of the coarse fiber in a disintegrator of the type described herein, the grain sorghum coarse fiber starch content may be reduced to about 17–22%. Reductions in starch contents of coarse fiber obtained in the milling of corn and other grains may also be obtained by means of a second treatment of the coarse fiber in a primary disintegrator.

When employing double pass primary disintegrating, the first pass coarse fiber discharge may be reslurried in process or fresh water and fed directly to the second pass disintegrating operation or it may be reslurried and also rescreened before redisintegrating, the latter procedure being somewhat preferable if maximum possible starch recovery is desired.

No claim is made herein to the apparatus shown in Figures 2 to 7.

We claim:

1. In a wet starch manufacturing process wherein a starch-bearing grain is steeped and cracked and the germs removed from the cracked material to form a material containing starch grits and fiber, the steps of subjecting said last named material to a disintegrating operation in which starch grits are disintegrated to finely divided starch particles and fiber is released with respect to starch particles, the zone of disintegration being surrounded by a screening area, establishing two discharges from the zone of disintegration, one discharge comprising relatively coarse fiber which is relatively free of starch, and the second comprising finely divided starch particles together with fine fibrous material, and continuously supplying supplemental water to the zone of disintegration to effect continual hydration of material undergoing disintegration.

2. In a wet starch manufacturing process wherein starch-bearing grain is subjected to steeping and cracking and germ removal operations to provide a material for further treatment containing starch grits and fiber, the steps of subjecting said material to impact disintegration in a disintegrating zone, said disintegrating zone being surrounded by a screening area, continuously supplying supplemental water to the disintegrating zone to effect continuous hydration of material undergoing disintegration, establishing two discharges from the disintegrating zone, one discharge comprising a coarse fiber relatively free of starch and the second discharge comprising finely divided starch together with fine fiber and then subjecting the last named drawoff to screening for removal of fine fiber and grits therefrom.

3. In a wet starch manufacturing process wherein starch-bearing grain is subjected to steeping and cracking and germ removal operations to produce a material containing starch grits and fiber, the steps of subjecting said material to impact disintegrating in a disintegrating zone, the disintegrating zone being surrounded by a screening area, continuously supplying a water spray to the disintegrating zone and within said screening area to effect continuous hydration of material undergoing disintegration, establishing two discharges from the disintegrating zone, one comprising finely divided starch and finer fiber passing through the screening area and the other comprising coarse fiber relatively free of starch and which is discharged at one end of the screening area, and then subjecting the first named discharge to screening for the removal of fine fiber and grits therefrom.

4. In a wet starch manufacturing process wherein starch-bearing grain is subjected to steeping, cracking, and germ removal operations to produce a material containing starch grits and fiber, the steps of subjecting said last named material to a disintegrating operation in which starch grits are disintegrated to finely divided starch particles and fiber is released with respect to starch particles, the disintegrating zone being surrounded by a screening area; continuously supplying water to the disintegrating zone and within the screening area to effect continuous hydration of the material undergoing disintegration; establishing two discharges from the zone of disintegration, one discharge comprising relatively coarse fiber relatively free of starch, and the second comprising freed starch, gluten, and fine fiber; and subjecting the coarse fiber discharge to a second disintegration to free additional starch therefrom.

5. In a wet milling process the steps comprising subjecting steeped, cracked, degerminated starch-bearing grain to a disintegrating operation to release starch particles from fiber, the zone of disintegration being surrounded by a screening area; continuously supplying water to said zone of disintegration and within the screening area to effect continuous hydration of the material undergoing disintegration; establishing two discharges from the zone of disintegration, one discharge comprising relatively coarse fiber which is relatively free of starch, and the second comprising freed starch, gluten, and finely divided fibrous material; passing said last-named discharge through a further disintegrating zone to release further quantities of starch from said fine fiber.

6. In a wet milling process, the steps comprising subjecting steeped, cracked, degerminated starch-bearing material to impact disintegration in a disintegrating zone, said disintegrating zone being surrounded by a screening area; continuously supplying supplemental water to the disintegrating zone to effect continuous hydration of material undergoing disintegration; establishing two discharges from the disintegrating zone, one discharge comprising coarse fiber relatively free of starch and the second discharge comprising finely divided starch, gluten, and fine fiber; subjecting the last named discharge to a further disintegrating operation to release starch from said fine fiber; and subjecting the mixture of starch, gluten, and fine fiber thus obtained to screening and washing operations for the removal of fine fiber therefrom.

7. Process according to claim 6, wherein said discharge comprising coarse fiber is subjected to a second impact disintegration to release additional starch therefrom.

8. In a wet-milling process, the steps comprising subjecting steeped, cracked degerminated starch-bearing material to impact disintegration in a disintegrating zone, said zone being surrounded by a screening area, continuously supplying a spray of water to the disintegrating zone and within said screening area to effect continuous hydration of said material undergoing disintegration; establishing two discharges from said disintegrating zone, one comprising water, starch, gluten, and fine fiber passing through the screening area, and the other comprising coarse fiber relatively free of starch discharged at one end of the screening area; subjecting the first-named discharge to a further disintegrating operation to release additional starch from the fine fiber particles; and subjecting the material obtained from this operation to washing and screening operations to remove fine fiber therefrom.

9. Process according to claim 8, wherein said starch-bearing material is a cereal grain.

10. Process according to claim 8, wherein said starch-bearing material is corn.

11. Process according to claim 8, wherein said starch-bearing material is grain sorghum.

12. In a wet milling process, the steps comprising subjecting steeped, cracked, degerminated starch-bearing material to impact disintegration in a disintegrating zone, said zone being surrounded by a screening area; continuously supplying a spray of water to said disintegrating zone and within said screening area; establishing two discharges from said disintegrating zone, one comprising water, starch, gluten, and fine fiber passing through the screening area and the other comprising coarse fiber relatively free of starch; subjecting the first-mentioned discharge to a screening operation to remove already loosened starch from grits and fibrous material; subjecting said grits and fibrous material to a further disintegrating operation to release additional quantities of starch, and subjecting the material from said further disintegrating operation to screening and washing operations to remove fine fiber therefrom.

13. Process according to claim 12, wherein said coarse fiber discharge is reslurried in water and subjected to a second impact disintegration to remove additional starch therefrom.

14. In a wet milling process for the recovery of starch from cereal grains, wherein the grain is steeped, cracked, and degerminated by floatation, the steps comprising screening the underflow from the germ separation to remove starch, gluten and grits already loosened from the unground grain, subjecting the tailings from said screening operation to impact disintegration in a disintegrating zone surrounded by a screening area, continuously supplying a spray of water to said disintegrating zone within the screening area, establishing two discharges from said disintegrating zone, one comprising water, starch, gluten and fine fiber and the other comprising coarse fiber relatively free of starch; subjecting said first-mentioned discharge from said disintegrating zone and the filtrate from said first screening operation to another screening operation to remove grits and fine fibrous material therefrom; subjecting said grits and fine fibrous material thus separated to a further disintegrating operation to release additional starch; and subjecting the material obtained from said further disintegrating operation to screening and washing operations to remove fine fiber therefrom.

15. Process according to claim 14, wherein said cereal grain is corn.

16. Process according to claim 14, wherein said cereal grain is grain sorghum.

17. Proccess according to claim 12, wherein said coarse fiber discharge is reslurried in water, screened, and the tailings from the screening operation subjected to a second impact disintegration to remove additional starch therefrom.

WILLIAM B. NEWKIRK.
EDGAR H. WILLIAMS.
CARL A. RIETZ.
ARCHIBALD B. DUNWODY.

REFERENCES CITED

The following references are of record in the file of this patent:

UNITED STATES PATENTS

| Number | Name | Date |
| --- | --- | --- |
| 1,083,128 | Paatz | Dec. 30, 1913 |
| 2,065,313 | Jefferies | Dec. 22, 1936 |
| 2,184,598 | John | Dec. 26, 1939 |
| 2,437,036 | Murer | Mar. 2, 1948 |